(12) United States Patent
Seitz et al.

(10) Patent No.: US 10,309,765 B2
(45) Date of Patent: Jun. 4, 2019

(54) COORDINATE MEASURING MACHINE HAVING AN IMPROVED OPTICAL SENSING SYSTEM AND RELATED METHOD

(71) Applicant: Carl Zeiss Industrielle Messtechnik GmbH, Oberkochen (DE)

(72) Inventors: Dominik Seitz, Schwaebisch Gmuend (DE); Frank Widulle, Neu-Ulm (DE); Philipp Jester, Heidenheim (DE); Aksel Goehnermeier, Essingen-Lauterburg (DE); Christoph-Hilmar Graf Vom Hagen, Schwaebisch Gmuend (DE); Andreas Ebser, Huettlingen (DE); Andreas Moebius, Jena (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 0 days.

(21) Appl. No.: 15/491,090

(22) Filed: Apr. 19, 2017

(65) Prior Publication Data
US 2017/0307355 A1    Oct. 26, 2017

(30) Foreign Application Priority Data

Apr. 20, 2016 (DE) .................. 10 2016 107 336

(51) Int. Cl.
*H04N 7/18* (2006.01)
*G01B 11/00* (2006.01)
(Continued)

(52) U.S. Cl.
CPC .......... *G01B 11/005* (2013.01); *G01M 11/00* (2013.01); *G06T 7/0004* (2013.01); *G06T 7/70* (2017.01);
(Continued)

(58) Field of Classification Search
CPC .................................................... G01B 11/005
USPC ........................................................... 348/94
See application file for complete search history.

(56) References Cited

U.S. PATENT DOCUMENTS

| | | | | |
|---|---|---|---|---|
| 3,936,149 A | * | 2/1976 | Imai | G02B 3/0087 359/654 |
| 4,498,778 A | * | 2/1985 | White | G01B 11/25 348/94 |

(Continued)

FOREIGN PATENT DOCUMENTS

| | | |
|---|---|---|
| DE | 27 01 764 A1 | 7/1978 |
| DE | 198 05 040 A1 | 8/1999 |
| EP | 1 618 349 B1 | 1/2006 |

*Primary Examiner* — Leron Beck
(74) *Attorney, Agent, or Firm* — Harness, Dickey & Pierce, P.L.C.

(57) ABSTRACT

Coordinate measuring machine, comprising an optical sensor for capturing image data of a workpiece. The optical sensor comprises a lens, which defines an optical axis, and an illumination device for illuminating the workpiece. The illumination device comprises a diffusely radiating luminous body and an optical filter having a plurality of separate light passages. Light emitted by the luminous body enters the filter on an underside thereof, passes through the light passages and emerges again from the filter on an opposite top side thereof. Each of the light passages transmits only light rays that form an angle smaller than a predefined limiting angle with a longitudinal axis of the respective light passage. The lens and the filter are inclined relative to one another in such a way that a normal vector aligned perpendicularly to the top side of the filter forms an inclination angle other than 0° with the optical axis.

16 Claims, 9 Drawing Sheets

(51) Int. Cl.
*G06T 7/70* (2017.01)
*G01M 11/00* (2006.01)
*G06T 7/00* (2017.01)
*H04N 5/225* (2006.01)

(52) U.S. Cl.
CPC .. *G06T 2207/30164* (2013.01); *H04N 5/2256* (2013.01)

(56) References Cited

U.S. PATENT DOCUMENTS

| | | | | |
|---|---|---|---|---|
| 5,409,538 A * | 4/1995 | Nakayama | ................ | G03F 7/20 118/688 |
| 5,661,546 A * | 8/1997 | Taniguchi | ........... | G03F 7/70058 355/30 |
| 5,781,302 A * | 7/1998 | Grow | ................ | G01B 11/306 356/600 |
| 5,849,375 A * | 12/1998 | Smith | ................ | B01D 39/086 428/34.5 |
| 5,982,489 A * | 11/1999 | Shiraishi | ................ | G01B 11/22 356/484 |
| 6,335,787 B1 * | 1/2002 | Nishi | ................ | G03F 7/70225 355/53 |
| 6,399,942 B1 * | 6/2002 | Ishihara | ................ | G02B 21/004 250/234 |
| 7,141,802 B2 * | 11/2006 | Takeyama | ........... | G02B 21/002 250/458.1 |
| 7,400,412 B2 | 7/2008 | Christoph | | |
| 8,422,127 B2 * | 4/2013 | Uchiyama | ............ | G02B 21/241 359/383 |
| 9,804,082 B2 * | 10/2017 | Mocnik | ................ | G01N 21/274 |
| 9,841,378 B2 * | 12/2017 | Thrush | ............... | G01N 21/6456 |
| 2001/0001572 A1 * | 5/2001 | Ikezawa | ........... | G01M 11/0228 356/124 |
| 2002/0080833 A1 * | 6/2002 | Matsuura | ............ | G02B 6/4201 372/20 |
| 2004/0191786 A1 * | 9/2004 | Yue | ....................... | G01N 33/542 435/6.18 |
| 2009/0251783 A1 * | 10/2009 | Huibers | ............. | G02B 27/1033 359/583 |
| 2009/0312859 A1 * | 12/2009 | Alpay | ............ | G05B 19/40938 700/103 |
| 2012/0082364 A1 * | 4/2012 | Tani | ........................ | G06T 7/408 382/133 |
| 2013/0176393 A1 * | 7/2013 | Onishi | ................... | G09G 3/003 348/43 |
| 2016/0252451 A1 * | 9/2016 | Kawate | ................ | G01N 21/474 359/858 |
| 2016/0290927 A1 * | 10/2016 | Buczkowski | ...... | G01N 21/6489 |

* cited by examiner

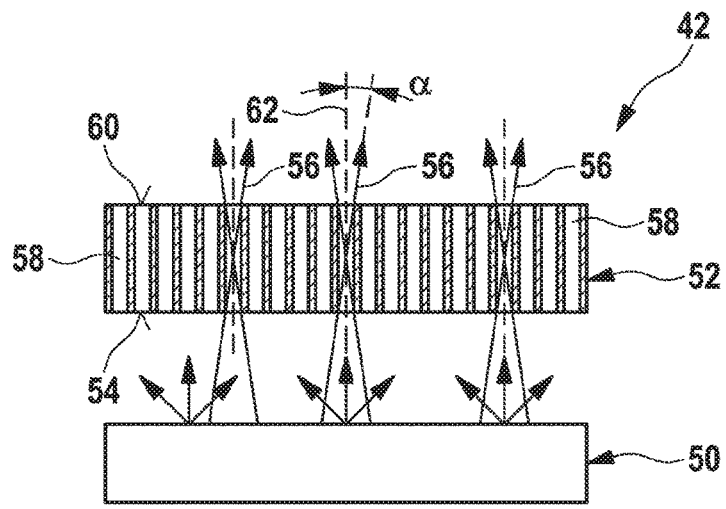
(Prior Art) Fig. 2
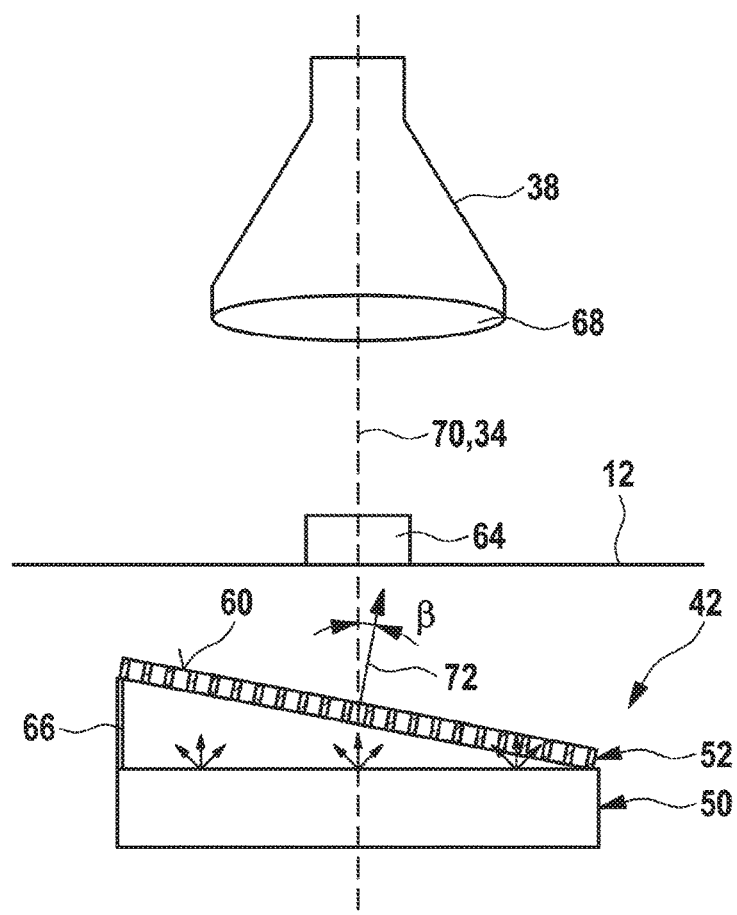
Fig. 3

COORDINATE MEASURING MACHINE HAVING AN IMPROVED OPTICAL SENSING SYSTEM AND RELATED METHOD

CROSS-REFERENCES TO RELATED APPLICATIONS

This application claims Convention priority of German patent application 10 2016 107 336.9, filed on Apr. 20, 2016. The entire content of this priority application is incorporated herein by reference.

BACKGROUND OF THE INVENTION

The present disclosure relates to a coordinate measuring machine for measuring spatial coordinates of a workpiece. Moreover, the present disclosure relates to a method for producing a coordinate measuring machine. Furthermore, the present disclosure relates to a method for measuring optical properties of an optical filter that is used in the coordinate measuring machine according to the disclosure.

Coordinate measuring machines serve for checking workpieces, for example as part of quality assurance, or determining the geometry of a workpiece completely as part of what is known as "reverse engineering". Moreover, diverse further application possibilities are conceivable, such as, for example, process-controlling applications, too, in which the measurement technique is applied directly for on-line monitoring and regulating of manufacturing and processing processes.

In coordinate measuring machines, different types of sensors may be used to capture the workpiece to be measured. By way of example, sensors that measure in tactile fashion are known in this respect, as are sold by the applicant under the name "VAST XT" or "VAST XXT". Here, the surface of the workpiece to be measured is scanned with a stylus, the coordinates of said stylus in the measurement space being known at all times. Such a stylus may also be moved along the surface of a workpiece in a manner such that a plurality of measurement points can be captured at defined time intervals in such a measurement process as part of a so-called "scanning method".

Moreover, it is known to use optical sensors that enable non-contact capture of the coordinates of a workpiece or measurement object. The present disclosure relates to such a coordinate measuring machine comprising an optical sensor.

In optical dimensional metrology, great outlays regularly arise if the form of workpieces is intended to be measured with accuracies in the range of single micrometres. This is generally attributable to the fact that comparatively complex and heavy sensors are guided by comparatively complex machines along preplanned trajectories. Subsequently or in parallel, the optically captured information is then related to the spatial information provided by the machine actuator system, such that the surface of the object to be measured can be reconstructed.

One example of an optical sensor that may be used in an optical coordinate measuring machine is the optical sensor sold by the applicant under the product designation "ViScan". An optical sensor of this type can be used in various types of measurement setups or coordinate measuring machines. Examples of such coordinate measuring machines are the products "O-SELECT" and "O-INSPECT", which are sold by the applicant.

A camera with high-resolution lens is usually used as optical sensor in such optical coordinate measuring machines. In optical metrology, to put it simply, the shadow casting of the measurement object is evaluated. To that end, on the imaging of the measurement object on the camera chip, the black-white transition is linked with the position of the measurement object. This link between image and object can be produced by calibration of the optical unit.

A basic prerequisite in the procedure mentioned above, however, is that the shadow casting, that is to say the bright and dark locations in the imaging that is imaged on the camera chip, also actually corresponds to the profile of the measurement object. For this reason, such optical systems that are intended to be used for metrological purposes have stringent requirements not only in respect of the imaging system but also in respect of the illumination system. Therefore, the illumination is ideally adapted to the imaging system in order to be able to achieve the best possible measurement results.

In order to be able to ensure the abovementioned stringent requirements in respect of the illumination system, a telecentric illumination optical unit is often used in optical coordinate measuring machines. For space and/or cost reasons, however, said telecentric illumination optical unit may also be replaced by a surface luminous element of flat design. However, this measure then limits the measurement accuracy on account of reflections of the diffuse light at the measurement object primarily in the case of volume parts. In order, even in the case of such a construction of the coordinate measuring machine, to attain once again the range of measurement accuracy such as is achievable using a telecentric illumination optical unit, the surface luminous source of flat design may also be replaced or extended by other components.

EP 1 618 349 B1 describes for example a coordinate measuring machine comprising a transmitted-light illumination arrangement, wherein the transmitted-light illumination arrangement comprises an illumination body in the form of a surface luminous source embodied such that it radiates diffusely. In addition to the image processing sensor system and said transmitted-light illumination arrangement, the coordinate measuring machine comprises a filter arranged between the surface luminous source and the measurement object. Said filter has channel-like passage openings that are aligned parallel to the optical axis of the lens of the image processing sensor system and transmit only rays at less than a predefined limiting angle $\alpha$ with respect to the optical axis. The limiting angle $\alpha$ at which rays can pass through the passage openings has a value of, in principle, less than 10°, preferably less than 3°, possibly even less than 1°. In accordance with the teaching of EP 1 618 349 B1, said optical filter is intended to avoid extraneous light that might otherwise pass into the optical unit, that is to say the image processing sensor system. The intention is thereby to avoid imaging aberrations and thus also measurement errors, in particular when measuring rotationally symmetrical parts.

It has been found, however, that with the use of an optical filter as described in EP 1 618 349 B1, very narrow tolerances would have to be complied with in order to align the diffusely radiating light of the surface luminous source such that the measurement errors described above cannot arise. For small areas to be illuminated, process-reliable production and mounting of such an optical filter is possible potentially in a relatively simple manner. However, if the area to be illuminated is a relatively large area, for example an area in the range of 100×100 $mm^2$, it is virtually impossible in practice to ensure the avoidance of measurement errors using the solution known from EP 1 618 349 B1. This is owing to the fact, in particular, that the optical filters used can scarcely fulfil the narrow tolerances required, owing to dictates of manufacturing.

The opening of the light cone that leaves one of the plurality of channel-like openings of the optical filter should typically have a value of less than 5°. The direction of the centroid ray, that is to say the direction of the light cone centre axis or light cone principal axis, should run perpendicularly to the mechanical surface of the filter. It goes without saying that these requirements must be met not just for one of the plurality of channel-like passage openings of the optical filter, but for all of the channel-like openings, that is to say must be identical over the entire surface of the optical filter.

Current measurements have revealed, however, that the above-described desired emission characteristic of the optical filter can scarcely be ensured, or can be ensured only with extremely high outlay, in practice for production engineering reasons. The measurements carried out by the applicant have revealed, for example, that although the emission characteristic of such an optical filter usually complies with the demanded 5° aperture angle of the light cones over the entire image field, the direction of the centroid rays, that is to say the centre axes of the light cones, is on no account aligned perpendicularly to the mechanical surface of the optical filter over the entire field of view. Instead, it has been found that this requirement (direction of the centroid rays perpendicular to the mechanical surface) not only is not met on average, but in addition is also different in a position-dependent manner.

In actual fact, therefore, with the use of an optical filter as proposed in EP 1 618 349 B1, the maximum possible quantity of light from the light source is not transmitted by the filter and picked up by the imaging optical unit or the optical sensor. In addition, on account of the above-described emission characteristic of the filter, undesired imaged patterns occur which adversely influence the measurement operation and subjective impression of the overall system.

SUMMARY OF THE INVENTION

It is thus an object to provide a coordinate measuring machine and a method for producing same which overcome the disadvantages mentioned above. It is particularly an object to reduce in the most cost-effective way possible the measurement inaccuracies that occur with the use of an optical filter of the type described above.

In accordance with an aspect of the present disclosure, a coordinate measuring machine is provided, comprising:
an optical sensor for optically capturing image data of a workpiece, wherein the optical sensor comprises a lens, which defines an optical axis;
an illumination device for illuminating the workpiece during the optical capture of the image data;
an evaluation unit configured to evaluate the captured image data and to determine spatial coordinates of the workpiece therefrom,
wherein the illumination device comprises a diffusely radiating luminous body and an optical filter having a plurality of light passages arranged alongside one another and separated from one another, wherein light emitted by the luminous body enters the filter on an underside thereof, passes through the light passages and emerges again from the filter on an opposite top side thereof, wherein each of the light passages transmits only light rays that form an angle smaller than a predefined limiting angle with a longitudinal axis or centre axis of the respective light passage, and
wherein the lens and the filter are inclined relative to one another in such a way that a normal vector aligned perpendicularly to the top side of the filter forms an inclination angle other than 0° with the optical axis, wherein the inclination angle corresponds to an average light emission direction of the filter, wherein the average light emission direction of the filter is an average value of light cone principal axis angles that is determined over at least two of the light passages of the filter, and wherein the light cone principal axis angles are angles that the principal axes of the light cones leaving the light passages form with the normal vector.

The present disclosure thus follows the concept of remedying the problems mentioned above, which problems substantially result from the non-uniform emission characteristic of the optical filter, by virtue of the fact that the lens and the filter are aligned relative to one another in such a way that a normal vector aligned perpendicularly to the top side of the filter forms an inclination angle not equal to 0° with the optical axis.

Therefore, unlike what is proposed in EP 1 618 349 B1, the top side of the filter is not aligned perpendicularly to the optical axis, but rather obliquely with respect thereto or at an angle not equal to 90°. In this case, the inclination angle at which the normal vector aligned perpendicularly to the top side of the filter is inclined relative to the optical axis corresponds to the average light emission direction of the filter, wherein the average light emission direction of the filter is an average value of light cone principal axis angles that is determined over at least two of the light passages, preferably over at least 10%, particularly preferably over at least 50%, of the light passages of the filter, wherein the light cone principal axis angles are angles that the principal axes or centre axes of the light cones leaving the light passages form with the normal vector.

The inclination between lens and filter is effected relative to one another. In absolute terms, this can be achieved both by an inclination of the filter and by an inclination of the lens.

By means of the alignment according to the disclosure of lens and filter relative to one another, the solution known from EP 1 618 349 B1 can be modified relatively simply from a production engineering standpoint, but in an extremely effective and advantageous way as a result. The relative inclination of the two components (lens and filter) that is oriented to the average light emission direction of the optical filter has the effect that, in contrast to the solution proposed in EP 1 618 349 B1, the quantity of light transmitted by the filter is significantly increased and the illumination aberrations brought about by the non-uniform emission characteristic of the filter and the measurement errors resulting therefrom can be significantly reduced.

The abovementioned object is therefore achieved completely.

The coordinate measuring machine preferably comprises a workpiece support for receiving the workpiece, wherein the workpiece support defines a z-axis running perpendicularly to the workpiece support. Said workpiece support is preferably a horizontally aligned plate or a horizontally aligned table. Such a plate and such a table respectively define the z-axis insofar as the latter runs perpendicularly thereto. It goes without saying that, depending on the requirement and the measurement task, the measurement object either can be placed directly on the workpiece support or can be positioned thereon by means of a further apparatus, for example a clamping apparatus.

In a refinement, the optical axis runs parallel to the z-axis and the normal vector forms the inclination angle with the z-axis.

In this refinement, therefore, the relative inclination described above is achieved by virtue of the fact that the optical filter is inclined relative to the z-axis, whereas the lens is not. This has the advantage, in particular, that the individual inclination of the filter can be effected separately, without this influencing the other components of the coordinate measuring machine. It is possible, for example, to produce the illumination device including the luminous body and the filter already inclined relative thereto by the individual inclination angle in a separate production process and then to incorporate it in its entirety as a module. The other components of the coordinate measuring machine would not have to be changed or adapted for this purpose.

In a further refinement of the coordinate measuring machine according to the disclosure, the normal vector runs parallel to the z-axis, and the optical axis forms the inclination angle with the z-axis.

In this refinement, the imaging lens is inclined, whereas the filter is arranged in the coordinate measuring machine in such a way that the top side thereof runs perpendicularly to the z-axis. Nevertheless, in accordance with this refinement, too, the optical axis of the imaging lens is aligned parallel to the maximum intensity or at least to the averaged maximum intensity of the light transmitted by the filter. In comparison with the above-described inclination of the filter, the inclination of the lens has the advantage that the position or alignment of the lens is readjustable relatively simply, such that said alignment can also be set subsequently as well, that is to say after installation of the filter. If the filter is changed, the alignment of the lens can then also be individually readjusted or set anew.

In accordance with a first alternative of the last refinement, the lens is movable along a movement axis running parallel to the z-axis, and the optical axis forms the inclination angle with the movement axis. Movement axis of the lens and optical axis thus diverge from one another. This has the consequence that the movement of the lens no longer takes place in the direction of the optical axis.

In accordance with a second variant of the refinement mentioned last, the lens is movable along a movement axis that forms the inclination angle with the z-axis and runs parallel to the optical axis. Although in this case, unlike what is usually the case in practice for coordinate measuring machines, the movement axis is inclined with respect to the z-axis, this variant has the advantage that the lens is moved along its optical axis or parallel thereto.

In accordance with a further refinement of the coordinate measuring machine according to the disclosure, the latter comprises a filter mount, in which the filter is fixable, wherein the filter mount defines a standing area and an inclination plane inclined relative thereto by the inclination angle, which inclination plane, with the filter inserted into the filter mount, is aligned parallel to the top side of the filter.

In this refinement, too, the filter is thus once again inclined relative to the z-axis. The filter mount ensures that the desired inclination is permanently maintained. The filter mount can be individually adapted to the optical properties of the filter and jointly incorporated with the latter into the coordinate measuring machine.

The filter mount can be configured in various ways. By way of example, a component produced by rapid prototyping and constructed in a layered fashion may be involved here. Said component may have a substantially wedge-shaped form whose outer shape is already adapted to the inclination angle to be realized. Such components can be produced in a simple manner by means of a 3D printer or some other rapid prototyping method.

A further possibility for a refinement of the filter mount mentioned above is a profile manufactured individually by means of a machining manufacturing method. Such a profile, which is optimally realized as an extruded profile made from aluminium or a similar suitable material, can be produced relatively simple and cost-effectively. In accordance with the required angles for ideally aligning the optical filter, in this case on a mitre saw it is possible to set the saw cut and the rotation of the extruded profile such that the required angles are automatically contained in the sawn-off sheet. As an alternative thereto, the component can also be produced by milling. Firstly, in this case once again sheets are preferably sawn off from a solid profile. In this case, the height of the sheets should be chosen such that in a subsequent milling step any angle combination is possible from this semi-finished product. This sheet is then processed further on a milling machine. If a 3-axis milling machine is involved, then firstly the coarse tilting would be milled in a roughing pass and afterwards the exact tilting would be milled from the semi-finished product by finishing using ideally a spherical cutter. On a 5-axis milling machine, this step can be made far simpler since the semi-finished product can be pivoted via the fourth and fifth axes such that the tilting can be implemented by means of a single milling pass using, for example, a single cutting head.

A further possibility for realizing the filter mount described above consists in using a mount with a height-adjustable 3-point support. By way of example, the inclination angle can be set by means of a mount having a 3-point support that is adjustable by means of screws. The information regarding how far what screw must be screwed in can be calculated on the basis of the above-described emission characteristic or average emission characteristic of the filter and then be provided beforehand individually for each filter to be clamped into this mount.

Yet another alternative for realizing the filter mount consists in using a cardanic suspension. Said cardanic suspension may be fixedly installed in the coordinate measuring machine, for example. As an alternative thereto, however, it may also be secured releasably in the coordinate measuring machine. In a manner similar to the above-described tilting of the lens, the use of a cardanic suspension for tilting the optical filter has the advantage that a readjustment is still possible even after installation in the coordinate measuring machine. The adjustment of the inclination angle can be ensured by means of motors, for example. However, a manual mechanical adjustment is likewise possible. In principle, it would also be possible firstly to set the optimum position by means of motors and then to fix the bearings of the cardanic suspension. This fixing of the bearings can be realized for example by means of adhesive, caulking or screwing. It is true that readjustment is no longer possible in that case. However, the ideal inclination angle set beforehand is lastingly maintained.

As already mentioned, the emission characteristic of each optical filter of the type mentioned above is different owing to dictates of manufacturing. In order to determine the above-described ideal inclination angle between the optical axis and the normal vector perpendicular to the top side of the filter, it is therefore necessary to individually determine the optical properties beforehand for each filter.

In accordance with a further aspect of the present disclosure, therefore, a method for measuring optical properties of an optical filter of the type mentioned above is proposed, wherein the method comprises the following steps:

providing an optical sensor comprising a lens, which defines an optical axis;

illuminating the filter from its underside by means of a diffusely radiating luminous body;

measuring, by means of the optical sensor, a quantity of light transmitted by the filter, wherein the quantity of light transmitted by the filter is measured at a plurality of measurement points on the top side of the filter and the lens and the filter are moved relative to one another during the measurement process, such that the quantity of light transmitted is measured for each of the measurement points from a plurality of orientations; and determining a distribution of the measured quantity of light transmitted depending on (i) a location on the top side of the filter and (ii) an emission angle relative to a normal vector aligned perpendicularly to the top side of the filter.

In the method mentioned above, the emission characteristic of the filter is thus measured depending on the location and the emission angle. To that end, the filter is illuminated from its underside by means of a diffusely radiating, preferably planar, luminous body. In the present case, a diffusely radiating luminous body is understood to mean a luminous body which ideally generates an illumination that is emissive uniformly in all directions or at least an illumination that is emissive uniformly in relation to the underside of the filter. It goes without saying that the present application does not necessarily require the use of a luminous body that is emissive in all directions or into an entire half-space (e.g. Lambertian emitter). A luminous body suffices which irradiates the entire underside of the filter at every point with approximately the same light intensity (including negligible deviations that occur in practice). Such a luminous body, too, should be understood in the present case as a diffusely radiating luminous body. The quantity of light transmitted by the filter is measured by means of an optical sensor, wherein the lens of the optical sensor and the filter are moved or inclined relative to one another during the measurement process. In a manner similar to that as already mentioned above with regard to the apparatus according to the disclosure, here as well once again either the filter or the lens can move during the measurement process.

It goes without saying that, for capturing individual images, the moved part (filter or lens) can in each case be stopped, that is to say that the movement can also be effected in a stepwise manner. In principle, however, it is also possible to capture images or image sequences during the movement and afterwards to evaluate them accordingly.

Irrespective of which of the two parts is moved during the measurement process, the abovementioned method preferably additionally comprises the following method step: Calculating an average light emission direction of the filter on the basis of the distribution determined, wherein the average light emission direction of the filter is an average value of light cone principal axis angles that is determined over at least two of the light passages of the filter, and wherein the light cone principal axis angles are angles that the principal axes of the light cones leaving the light passages form with the normal vector. The average light emission direction of the filter thus calculated can then be used for the individual setting of the inclination angle.

As likewise already mentioned, two variants exist for the measuring step in the method mentioned above.

In accordance with a first variant for measuring the quantity of light transmitted by the filter, the lens is moved for each of the measurement points in a stepwise manner into a plurality of positions, wherein a respective image is captured in each of said positions by means of the optical sensor, and wherein the positions lie on a spherical cap and are at the same distance from the respective measurement point on the top side of the filter. This measurement procedure is then carried out individually for each individual measurement point.

In this variant, therefore, for example a measuring camera (optical sensor) is moved around the optical filter in order to optically capture the latter from different "viewing angles", while the optical filter is illuminated from its underside by means of the diffusely radiating light source. The movement of the measuring camera can ideally be realized by means of a 5-axis coordinate measuring machine, in which the optical sensor can be moved or inclined via a rotary-pivoting joint. For each measurement point on the top side of the filter, the five axes of the coordinate measuring machine are then varied such that the sighted spatial point on the top side of the filter is always the same and only the rotation and the inclination of the point sighted by the camera and lens change. The positions adopted here by the lens accordingly all lie on a spherical cap whose aperture angle corresponds to the angle range to be checked, the radius of which corresponds to the focus distance of the lens and the centre point of which is the measurement point on the top side of the filter.

The light intensities thus measured by means of the optical sensor can then be plotted against the azimuth and declination angle for each individual measurement point in a diagram. This results in a distribution of the measured quantity of light transmitted as a function of the emission angle for a measurement point.

If the intention is then to determine the emission behaviour of the optical filter on a plurality of measurement points, the measuring step described above must be repeated in each case for each of these further measurement points. This then results in a distribution of the measured quantity of light transmitted not only as a function of the emission angle but also as a function of the location on the top side of the filter.

A second possibility for the measurement process mentioned above is that, during the measurement process, the filter is pivoted in a stepwise manner into a plurality of positions about two of its principal axes aligned orthogonally with respect to one another, said principal axes being in each case perpendicular to the normal vector of the top side of the filter, and an image is captured in each of said positions by means of the optical sensor. To that end, the filter can be pivoted in a stepwise manner transversely with respect to the optical axis of the measuring camera (optical sensor) for example by means of a rotary-tilting apparatus in the form of a cardanic suspension. Analogously to the first measurement possibility mentioned above, the quantity of light transmitted is detected for each angular position. Preferably, for this purpose, a telecentric lens having a numerical aperture smaller than the emission angle to be measured is used as lens.

A major difference and at the same time also a major advantage of this second measurement variant is that for each angular position the entire field of view of the optical sensor, that is to say a plurality of spatial measurement points on the top side of the filter, can be captured simultaneously. For each now freely selectable measurement point, analogously to the first measurement variant, the angles of the direction of the quantity of light maximally emitted by the filter and also the average direction of the maximally emitted quantity of light of the filter are then determined.

Preferably, to that end, grey-scale values are determined in each of the captured images in a plurality of defined image regions and the distribution of the measured quantity of light transmitted is determined on the basis of the grey-scale values determined.

It goes without saying that this type of measurement, in comparison with the first measurement variant described above, besides the time saving, is also more cost-effective since the measurement set-up required for this can be realized relatively simply and with the conventional components of a coordinate measuring machine.

In accordance with a further aspect of the present disclosure, a production method is provided in the present case, which production method comprises the following method steps:
  providing a coordinate measuring machine comprising (i) an optical sensor for optically capturing image data of a workpiece, wherein the optical sensor comprises a lens, which defines an optical axis, and comprising (ii) an illumination device for illuminating the workpiece during the optical capture of the image data, wherein the illumination device comprises a diffusely radiating luminous body, and comprising (iii) an evaluation unit configured to evaluate the captured image data and to determine spatial coordinates of the workpiece therefrom;
  providing an optical filter having a plurality of light passages arranged alongside one another and separated from one another, which light passages are arranged in the region between an underside of the filter and an opposite top side of the filter, wherein each of the light passages transmit only light rays that form an angle smaller than a predefined limiting angle with a longitudinal axis of the respective light passage;
  determining a distribution of a measured quantity of light transmitted depending on (i) a location on the top side of the filter and (ii) an emission angle relative to a normal vector aligned perpendicularly to the top side of the filter by means of the measuring method mentioned above;
  determining an inclination angle on the basis of the determined distribution;
  positioning the filter on the luminous body, such that light that is emitted by the luminous body enters on the underside of the filter and at least partly emerges again on the opposite top side of the filter; and
  aligning the lens and the filter relative to one another in such a way that a normal vector aligned perpendicularly to the top side of the filter forms an inclination angle not equal to 0° with the optical axis.

It goes without saying that, in the method mentioned above, the step of positioning the filter on the luminous body and the step of aligning the lens relative to the filter can also be effected in one step.

It is understood that the aforementioned features and those yet to be explained below may be used not only in the respectively specified combination but also in other combinations or on their own, without departing from the spirit and scope of the present disclosure. Likewise, it should be pointed out that the abovementioned refinements described with regard to the coordinate measuring machine according to the disclosure also relate in a corresponding manner to the measuring method according to the disclosure and the production method according to the disclosure.

BRIEF DESCRIPTION OF THE DRAWINGS

Exemplary embodiments are shown in the drawings and are explained in greater detail in the following description. In the figures:

FIG. 2 shows a schematic cross-sectional view of an exemplary embodiment of a luminous source with optical filter which can be used in the coordinate measuring machine according to the disclosure;

FIG. 3 shows a schematic cross-sectional view of a first exemplary embodiment of an illumination and imaging situation such as can occur in the presented coordinate measuring machine;

DESCRIPTION OF PREFERRED EMBODIMENTS

Figure 1:
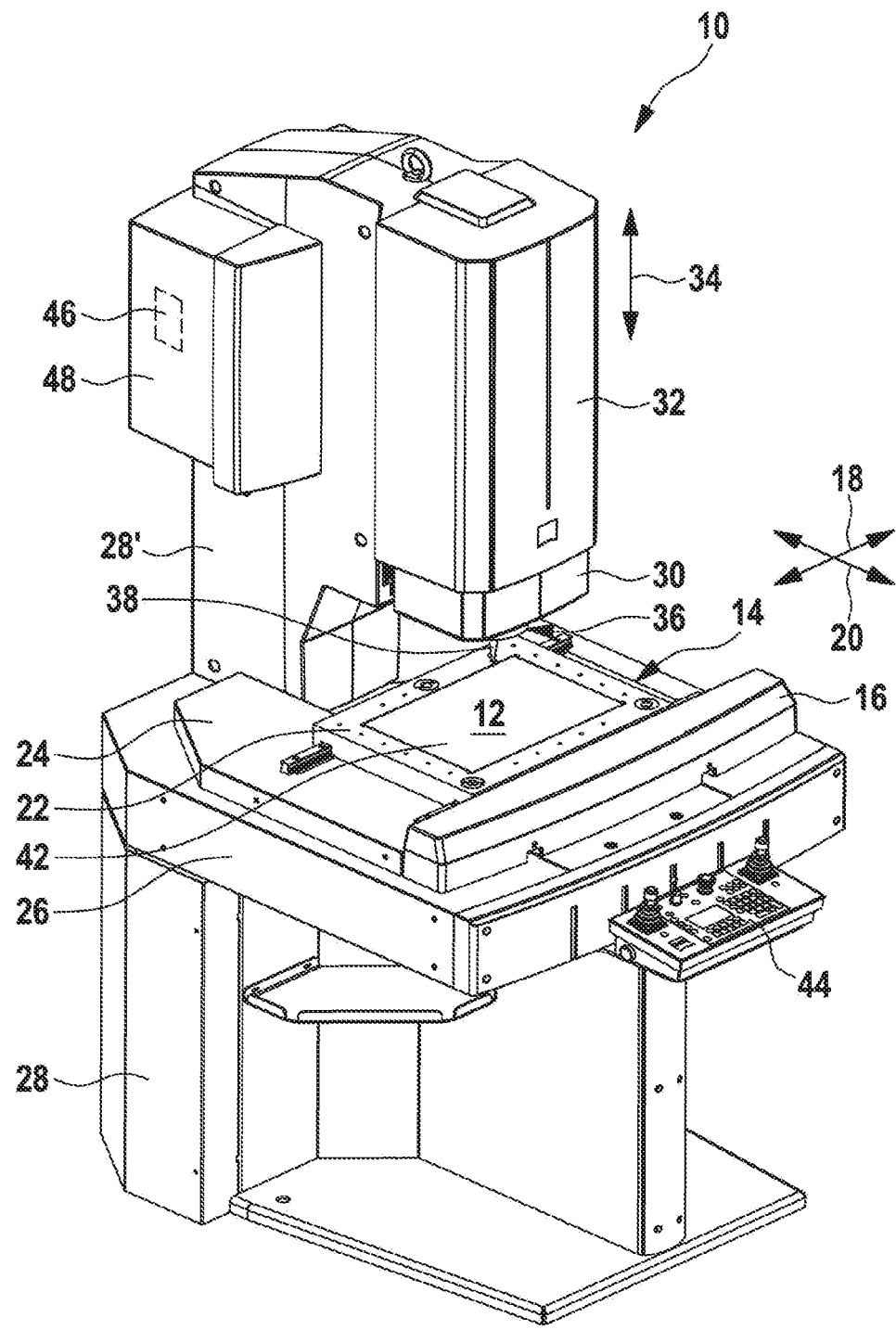
FIG. 1 shows a perspective view of an exemplary embodiment of a coordinate measuring machine.

FIG. 1 shows a coordinate measuring machine in accordance with an exemplary embodiment. The coordinate measuring machine is designated as a whole therein by the reference numeral 10.

The coordinate measuring machine 10 comprises a workpiece support 12, on which a workpiece to be measured can be positioned. Said workpiece support 12 is arranged on a measuring table 14. Depending on the embodiment of the coordinate measuring machine, said measuring table can be a fixed, that is to say immobile, measuring table. In the embodiment illustrated in FIG. 1, a measuring table 14 is involved which is movable linearly in the measuring table plane along two coordinate axes 18, 20, which are aligned orthogonally with respect to one another, by means of a positioning device 16. The first coordinate axis 18 is normally designated as the x-axis, and the second coordinate axis 20 as the y-axis.

In the exemplary embodiment of the coordinate measuring machine 10 as shown in FIG. 1, the measuring table 14 is realized in a so-called cross-table design. It comprises an X-table 22, which is movable linearly along the first coordinate axis 18 (x-axis) and on the top side of which the workpiece support 12 is arranged. The X-table 22 in turn bears on a Y-table 24, which is arranged parallel thereto and by means of which the workpiece support 12 is movable linearly along the second coordinate axis 20 (y-axis). The Y-table 24 in turn is arranged on a solid baseplate 26, which is often designated as mounting plate 26. The baseplate 26 serves as a carrier structure for the measuring table 14 and is usually connected to a machine frame 28 in an integrated fashion.

In addition to the lower part supporting the baseplate 26, the machine frame 28 also comprises an upper part 28', which usually, but not absolutely necessarily, is connected to the lower part of the machine frame 28 in an integrated fashion. Said upper part 28' of the machine frame 28 is often also designated as a Z-column.

In the exemplary embodiment of the coordinate measuring machine 10 as shown in FIG. 1, a so-called Z-slide 30 is attached to the Z-column 28' in a linearly displaceable fashion. Said Z-slide 30 is preferably guided by means of a linear guide within a slide housing 32, which is fixedly connected to the Z-column 28. The Z-slide 30 is thus movable along a third coordinate axis 34, which is usually designated as the z-axis, orthogonally with respect to the measuring table 14, or orthogonally with respect to the other two coordinate axes 18, 20. A measuring head 36 is arranged on the underside of the Z-slide 30 facing the measuring table 14. Depending on the embodiment of the coordinate measuring machine 10, the measuring head 36 comprises one or a plurality of sensors. In the present case, the measuring head 36 comprises an optical sensor 38, by means of which the workpiece to be measured, which is positioned on the workpiece support 12, can be optically captured. Image data of the workpiece can be captured by means of said optical sensor 38. A camera with high-resolution optical unit is preferably used for this purpose. In the present case, image data are generally understood to mean images or image sequences of the workpiece.

The coordinate measuring machine 10 furthermore comprises an illumination device 42. Said illumination device 42 serves for illuminating the workpiece to be measured during the optical capture of the image data by means of the optical sensor 36. In the present exemplary embodiment of the coordinate measuring machine 10, said illumination device 42 is a so-called transmitted-light illumination arrangement. In transmitted-light illumination, the light source is situated behind the workpiece to be measured, relative to the optical sensor 36. The illumination device 42 is therefore preferably integrated into the measuring table 14 or arranged beneath the latter. In the present case, the workpiece support 12 is preferably embodied such that it is light-transmissive. In this way, regions which are not concealed by the workpiece to be measured appear bright on the optical sensor 38. Conversely, regions which are concealed by the workpiece to be measured appear dark on the optical sensor 38.

The coordinate measuring machine 10 furthermore comprises operating and switching instruments 44, with which an operator can manually control and/or position the optical sensor 38 and also the workpiece receptacle 12.

In accordance with the exemplary embodiment shown in FIG. 1, a control unit or evaluation unit 46 (both terms are used equivalently in the present case) is arranged in a receptacle container 48 attached to the Z-column 28'. Said control unit 46 serves for controlling a plurality of components of the coordinate measuring machine 10. Inter alia, it serves to evaluate the image data captured by the optical sensor 38 by means of known metrological image processing software in order to calculate therefrom the coordinates of the workpiece to be measured. The control or evaluation unit 46 is preferably embodied in the form of computer hardware on which corresponding software is installed.

It should be understood that the coordinate measuring machine 10 shown in FIG. 1 is merely one of many possible exemplary embodiments of a coordinate measuring machine. The measuring table 14 can, in principle, also be embodied in an immobile fashion. The way in which the measuring head 36 is suspended at the machine frame 28 can also be embodied differently, in principle. Particularly the kinematics by means of which the measuring head 36 and the workpiece to be measured are moved relative to one another can be embodied structurally differently. The measuring head 36 with the optical sensor 38 arranged therein may also be pivotable about one, two, three or more axes for example in addition to the movability along the z-axis 34. Moreover, it is possible for the slide housing 32 and/or the measuring head 36 also to be movable along the x-axis 16 and/or along the y-axis 20.

Likewise, it should be pointed out that the illumination device can also comprise a reflected-light illumination arrangement instead of the transmitted-light illumination arrangement or in addition thereto. In reflected-light illumination, the workpiece to be measured is illuminated from the lens side, that is to say from the side of the optical sensor 38. To that end, a reflected-light illumination arrangement comprises one or a plurality of illuminants that are preferably arranged around the optical sensor 38. Said illuminants may be arranged around the sensor 38 for example in a ring-shaped fashion. It goes without saying, however, that other geometrical arrangements are also conceivable, in principle.

FIG. 2 shows a schematic cross-sectional view of one exemplary embodiment of an illumination arrangement 42 which can be used for example as a transmitted-light illumination arrangement integrated into the measuring table 14 in the coordinate measuring machine 10. The illumination device 42 illustrated here comprises a luminous source 50 and also an optical filter 52. The luminous source 50 is preferably a surface luminous source. In any case it is a diffusely radiating luminous body. By way of example, a plurality of LEDs arranged in a row, in a matrix or in concentric circles can be used here. By way of example, a glass plate can be arranged above said LEDs.

The optical filter 52 is illuminated from its underside 54 by means of the diffusely radiating luminous body 50. The light rays emanating from the luminous body 50, said light rays being indicated by means of the arrows 56, enter light passages 58 arranged alongside one another on the underside 54 of the filter 52 and emerge again from said light passages on the top side 60 of the filter 52. The light passages 58 arranged alongside one another are preferably produced by means of individual films or lamellae adhering to one another. In this case, the light passages 58 of the filter 52 are designed in such a way that light rays 56 that enter one of the light passages 58 on the underside 54 of the filter 52 cannot cross to an adjacent light channel 58 within the filter 52. The individual light passages 58 are thus optically isolated from one another. Furthermore, the light passages 58 are designed in such a way that each of the light passages 58 transmits only light rays 56 that form an angle smaller than a predefined limiting angle α with a longitudinal axis 62 of the respective light passage 58. By contrast, light rays 56 that form an angle greater than said predefined limiting angle α with the longitudinal or centre axis 62 of the respective light passage 58 cannot emerge from the light passages 58. The light passages 58 are indicated as channel-like light passages in the figures. This need not necessarily be the case in practice. The light passages 58 may also be mutually separated openings or a type of grating structure arising at the interface between a plurality of mutually perpendicular gaps of a lamella structure. Therefore, in contrast to the illustration shown in FIG. 2, the light passages 58 need not extend from the underside 54 as far as the top side 60. All that is important is that they are arranged, from a spatial point of view, between the underside 54 and the top side 60. Furthermore, it should be pointed out that on no account is it mandatory for the light passages 58 to involve material cutouts. The light passages can also be realized by a light-transmissive, that is to say transparent, material surrounded by light-nontransmissive material. The term "light transmission" is also not intended to imply any cross-sectional shape whatsoever.

It should be pointed out that the arrangement of the illumination device 42 as shown in FIG. 2 is already known, in principle, from the prior art. It has now been found, however, that the above-described optical behaviour of the filter 52 can be complied with only with very great difficulty, owing to dictates of manufacturing. In this case, it has been found, in particular, that in practice the longitudinal axes 62 of the individual light passages 58 are not always aligned exactly parallel to one another. The top side 60 of the filter 52 also does not always run exactly perpendicularly to the longitudinal axes 62 of the light passages 58. As a result of this it is also evident that the direction of the centroid rays, that is to say the direction of the centre axes of the light cones that leave the individual light passages 58, does not always run exactly perpendicularly to the top side 60 of the filter 52.

The measurements performed by the applicant have revealed, for example, that although the emission characteristic of such an optical filter 52 usually complies with a required aperture angle of the light cones in the region of 5° over the entire field of view of the filter 52, the direction of the centroid rays of said light cones are not all aligned parallel to one another. The direction of the centroid rays varies in a position-dependent manner in practice. It thus differs from light passage 58 to light passage 58.

FIG. 3 shows a schematic cross-sectional view of a first exemplary embodiment as to how the abovementioned disadvantages within the illumination device 42 can be avoided. To put it more precisely, FIG. 3 shows an illumination and imaging situation of a workpiece 64 to be measured, which is positioned on the workpiece support 12. The workpiece 64 is once again illuminated by means of a diffusely radiating luminous body 50, on the top side of which the filter 52 is mounted by means of a mount 66. Even though the mount 66 in the present example is directly connected to the luminous body 50, this is not absolutely necessary as long as the mount 66 or in particular the filter 52 is arranged in the region between the luminous body 50 and the workpiece 64 to be measured. The abovementioned problem of the non-ideal emission characteristic occurring in practice for the filter 52 is avoided in accordance with the exemplary embodiment shown in FIG. 3 by virtue of the fact that the filter 52 is arranged obliquely by means of the mount 66.

Unlike in the embodiment known from the prior art, as shown in FIG. 2, in the case of the exemplary embodiment as illustrated in FIG. 3 the filter 52 is not arranged perpendicularly to the optical axis 70 of the lens 68 of the imaging optical unit or of the optical sensor 38. To put it more precisely, the filter 52 is arranged in such a way that a normal vector 72 aligned orthogonally with respect to the top side 60 of the filter 52 forms an angle β not equal to 0° with the optical axis 70 of the lens 58. This inclination angle β preferably corresponds to the average light emission direction of the filter 52, wherein the average light emission direction of the filter 52 is an average value of light cone principal axis angles averaged over a plurality of measurement points, wherein in the present case the light cone principal axis angles are understood to mean angles that the principal axes of the light cones that leave the individual light passages 58 form with the normal vector 72. The non-uniform emission characteristic of the filter is thus compensated for by virtue of the fact that the filter 52 is inclined relative to the optical axis 70 by the average light emission direction that can be determined for each filter 52.

Figure 4:
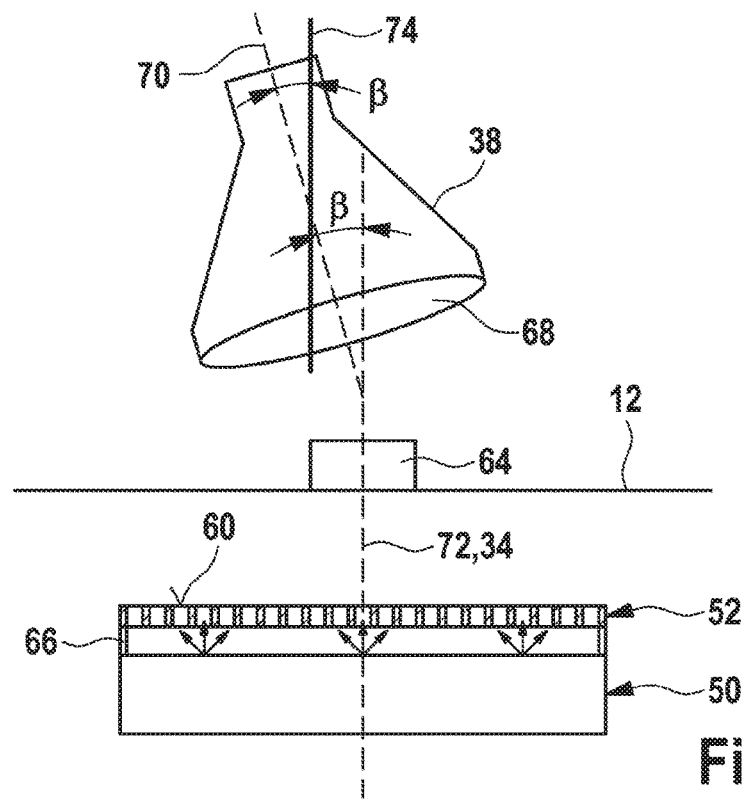
FIG. 4 shows a schematic cross-sectional view of a second exemplary embodiment of an illumination and imaging situation such as can occur in the presented coordinate measuring machine.
Figure 5:
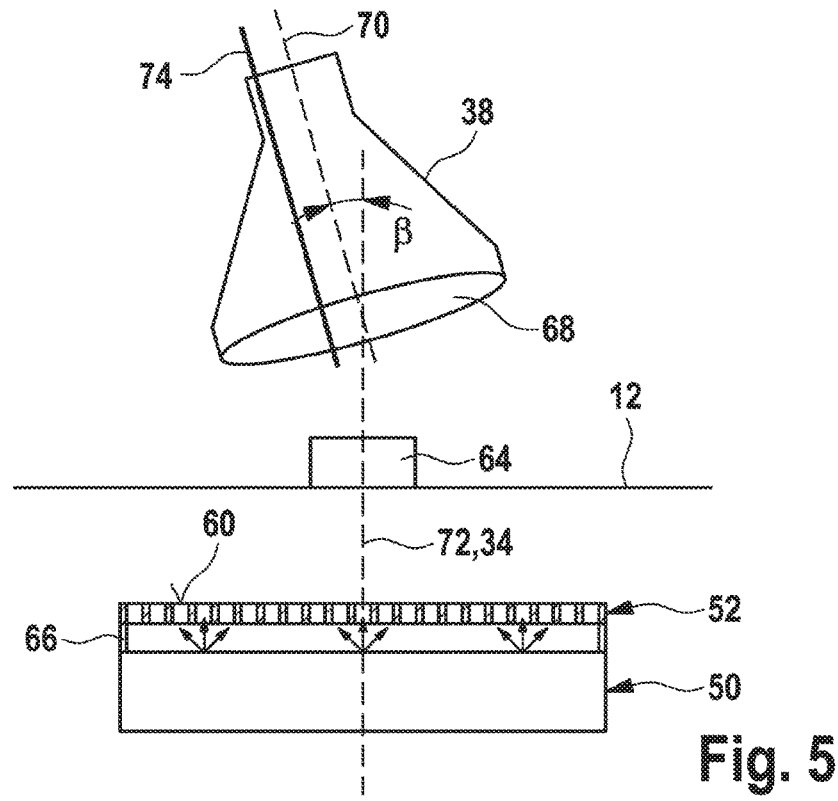
FIG. 5 shows a schematic cross-sectional view of a third exemplary embodiment of an illumination and imaging situation such as can occur in the presented coordinate measuring machine.

Two further exemplary embodiments are illustrated in FIGS. 4 and 5. These two exemplary embodiments follow the same inventive principle as the exemplary embodiment illustrated in FIG. 3. Here, too, filter 52 and lens 68 are inclined relative to one another in such a way that the normal vector 72 aligned perpendicularly to the top side 60 of the filter 52 forms the inclination angle β with the optical axis 70 of the lens 68, said inclination angle corresponding to the average light emission angle of the filter 52. The differences of these two exemplary embodiments consist, however, in the fact that now the lens 68 is inclined, rather than the filter 52. In the exemplary embodiment illustrated in FIG. 3, the optical axis 70 of the lens 68 preferably coincides with the z-axis 34, which runs perpendicularly to the workpiece support 12. In the exemplary embodiments illustrated in FIGS. 4 and 5, by contrast, the optical axis 70 of the lens 68 forms in each case the inclination angle β with the z-axis 34. By contrast, the normal vector 72 of the filter 52 runs parallel to the z-axis 34. Ultimately, the same advantageous effect is produced in these two exemplary embodiments as well, namely that the non-uniform emission characteristic of the filter 52 is compensated for in a manner governed by the inclination and the maximum possible quantity of light can thus pass through the lens 68 to the optical sensor 38.

In the case of the embodiment shown in FIG. 4, the optical axis 70 is inclined relative to the normal vector 72 and the z-axis 34 by the inclination angle β. In addition, the optical axis 70 is also inclined relative to the movement axis 74 of the lens 68 by the inclination angle β. In this example, therefore, the movement axis 74 runs parallel to the z-axis 34 or even coincides with the latter.

In the case of the embodiment shown in FIG. 5, by contrast, the movement axis 74 is likewise inclined relative to the z-axis 34 by the inclination angle β. In this case, the optical axis 70 and the movement axis 74 thus coincide.

Figure 6:
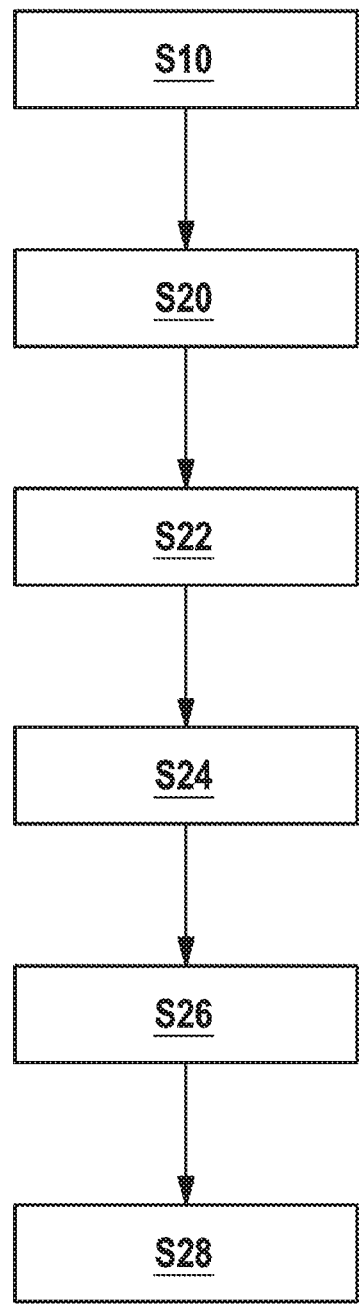
FIG. 6 shows a schematic flow diagram for illustrating an exemplary embodiment of the production method.

FIG. 6 shows a schematic flow diagram for illustrating an exemplary embodiment of the production method.

A first step S10 involves providing an optical coordinate measuring machine comprising its basic components such as optical sensor, illumination device and evaluation unit. Such a coordinate measuring machine may correspond for example to the exemplary embodiment shown in FIG. 1.

Step S20 involves providing the filter 52 mentioned above.

Since the average light emission direction of the filter 52 as discussed above is an individual variable that differs from filter to filter in a manner governed by manufacturing, the next method step S22 involves measuring the optical properties of the filter 52. The measuring method applied in said method step S22 is explained in even greater detail further below on the basis of two exemplary embodiments. The result of method step S22 is preferably the determination of a distribution of the quantity of light transmitted by the filter as a function of the location on the top side of the filter 42 and also as a function of the emission angle relative to the normal vector 72 aligned perpendicularly to the top side 60 of the filter 52.

On the basis of the determined distribution (light emission characteristic of the filter 52), the inclination angle β can then be determined in method step S24.

As soon as said inclination angle β that is to be determined individually for each filter has been determined, in method step S26 the filter 52 can be positioned on the luminous body 50 and installed jointly with the latter in the coordinate measuring machine 10.

Method step S28 then involves aligning lens 68 and filter 52 relative to one another, specifically in such a way that the normal vector 72 forms the inclination angle β with the optical axis 70. As already mentioned above, this can be effected either by inclination of the filter 52 or by inclination of the lens 68.

In the event of the filter 52 being changed and replaced by a new filter, steps S20-S28 would be correspondingly repeated for the new filter.

Figure 7:
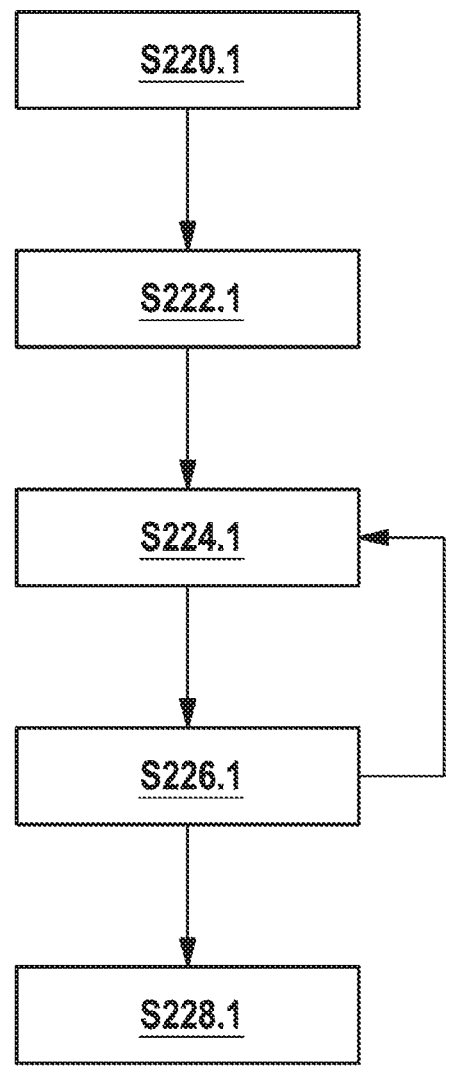
FIG. 7 shows a schematic flow diagram for illustrating a first exemplary embodiment of the method for measuring optical properties of an optical filter.

FIG. 7 shows a first exemplary embodiment of the measuring method, which can be carried out in method step S22 of the production method illustrated in FIG. 6.

Method step S220.1 involves firstly providing an optical sensor having a high-resolution lens. Said optical sensor may be the same optical sensor 38 that is used in the coordinate measuring machine 10 from FIG. 1. For carrying out the measuring method, however, it is important that the optical sensor 38 together with lens 68 is not only translationally movable but also rotatable about two rotation axes.

The next step S222.1 involves illuminating the filter 52 from its underside by means of the diffusely radiating luminous body 50.

In step S224.1, the optical sensor used for the measurement is aligned with a first measurement point on the top side 60 of the filter.

Figure 8:
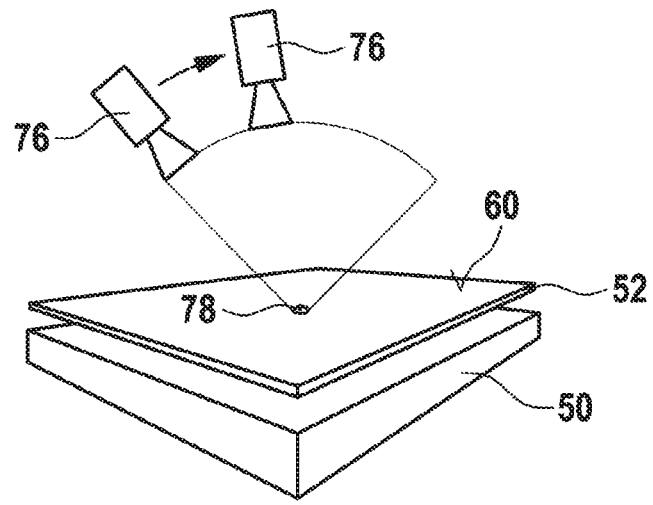
FIG. 8 shows a schematic basic representation for illustrating a substep of the first exemplary embodiment of the measuring method.

In step S226.1, the quantity of light transmitted by the filter 52 at the measurement point is measured from a plurality of viewing directions. FIG. 8 schematically shows the principle of this measuring step. It can be seen here, in particular, that a high-resolution camera 76 used as the optical sensor, during measuring step S226.1, moves in a stepwise manner to different positions, all lying on the surface of a spherical cap whose centre point is an instantaneously sighted measurement point 78 on the top side 60 of the filter 52. The aperture angle of said spherical cap corresponds to the aperture angle of the angle range to be tested. The radius of the spherical cap corresponds to the focus distance of the lens. In step S226.1, therefore the camera 76 is moved in a stepwise manner along a spherical cap, wherein this constantly sights the same measurement point 78 during the movement. The image data recorded by the camera 76 during this movement thus provide information about the emission characteristic of the filter 52 at the instantaneously examined measurement point 78.

However, since said emission characteristic of the filter 52 is intended to evaluate not just one measurement point on the top side 60 of the filter 52, method steps S224.1 and S226.1 are correspondingly repeated for a plurality of measurement points 78 on the top side 60 of the filter 52.

As a result, in method step S228.1 it is possible to calculate a distribution of the quantity of light transmitted by the filter 52 as a function of the location on the top side 60 of the filter 52 and also as a function of the emission angle relative to the normal vector 70.

Figure 9:
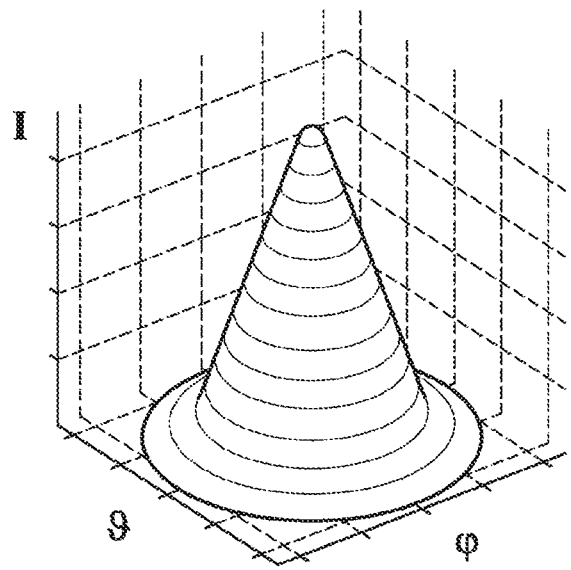
FIG. 9 shows a diagram for illustrating an exemplary distribution of the quantity of light transmitted as a function of two emission angles aligned orthogonally with respect to one another.

FIG. 9 shows by way of example the emission characteristic of the filter at one of the measurement points 78. In the diagram illustrated in FIG. 9, the light intensity is plotted on the vertical z-axis and the mutually perpendicular emission angles are plotted on the horizontal x- and y-axes, each of said emission angles being measured relative to the normal vector 70.

Figure 10:
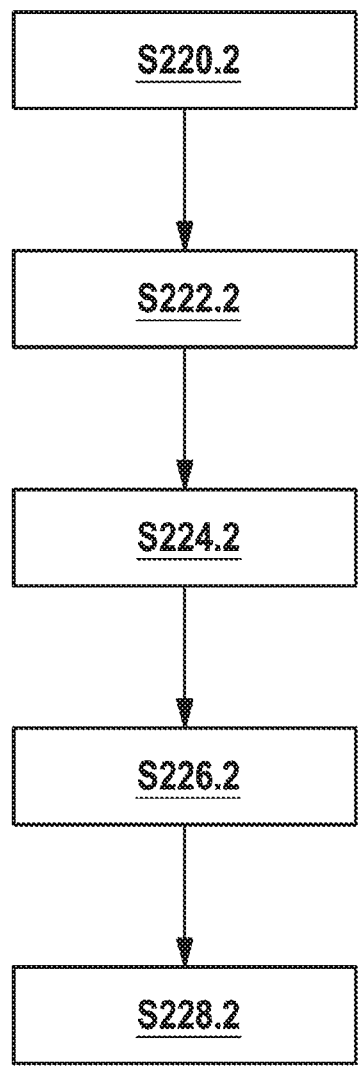
FIG. 10 shows a schematic flow diagram for illustrating a second exemplary embodiment of the measuring method.

FIG. 10 shows a second exemplary embodiment for carrying out the measuring method for determining the optical properties of the filter 52.

Steps S220.2 and S222.2 are identical to steps S220.1 and S222.1 from the measuring method illustrated in FIG. 7.

However, steps S224.2 and S226.2 deviate from steps S224.1 and S226.1 insofar as in the measuring method in accordance with the second variant, during the measurement, the filter 52 is moved rather than the optical sensor.

Figure 11:
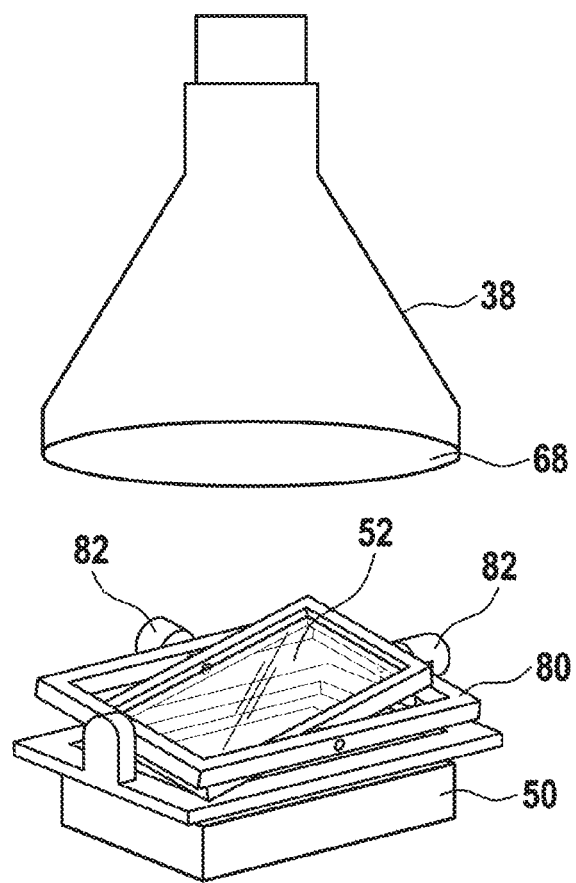
FIG. 11 shows a schematic basic representation for illustrating a measurement setup for carrying out the second exemplary embodiment of the measuring method.

FIG. 11 schematically shows one possible measurement set-up for carrying out the measuring method in accordance with the second exemplary embodiment. The imaging optical unit 68 is fixed, that is to say immobile, therein during the measurement. By contrast, the filter 52 is clamped into a cardanic suspension 80, by means of which the filter 52 is pivotable about two axes aligned perpendicularly to one another. Each of these two pivoting axes of the cardanic suspension 80 can be assigned a motor, for example, which is used as an actuator for the respective pivoting movement.

The measurement set-up mentioned above thus makes it possible to pivot the filter 52 in a stepwise manner into a plurality of spatial positions during measuring step S224.2 and, for each position, to capture image data on the basis of which subsequently it is possible to evaluate the quantity of light transmitted by the filter 52 at different measurement points of the filter 52. A telecentric imaging optical unit 68 is preferably used for this type of measurement.

It goes without saying that it is necessary to know the angular positions of the filter 52 for each of the positions moved to in step S224.2 by means of the cardanic suspension 80. The motors 82 should therefore be calibrated exactly. In order to eliminate possible calibration errors, however, it is also possible in principle to carry out a reversal measurement in which the filter is rotated by 180° about its longitudinal axis and then the same measurement is carried out once again in the same positions. This affords the possibility of being able to use even more cost-effective stepper motors for this method.

Figure 12:
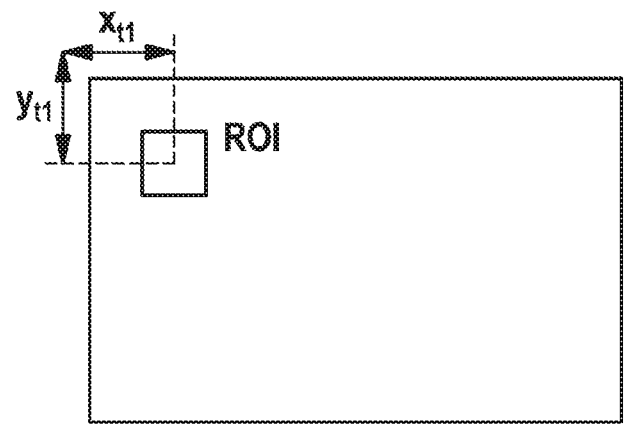
FIG. 12 shows a further basic representation for illustrating a method step of the second exemplary embodiment of the measuring method.

The image data captured in step S224.2 are then evaluated in method step S226.2. This situation is illustrated schematically in FIG. 12 by way of example for one of the images, which was captured in a specific position of the filter 52. The region to be examined of the top side 60 of the filter 52 should be represented completely in each of the images. In this way, it is possible then to evaluate in each individual image a plurality of measurement points or regions of interest (ROI). FIG. 12 shows this process by way of example for one ROI. In this case, the position of the ROIs corresponds to the position of the locations to be evaluated on the top side 60 of the filter 52. Step S226.2 involves determining the average grey-scale values of all the ROIs to be examined for each ROI individually. Of course, this process is carried out not just for one image, that is to say one spatial position of the filter 52, but for all the images, that is to say all the positions or viewing angles to be determined.

Figure 13:
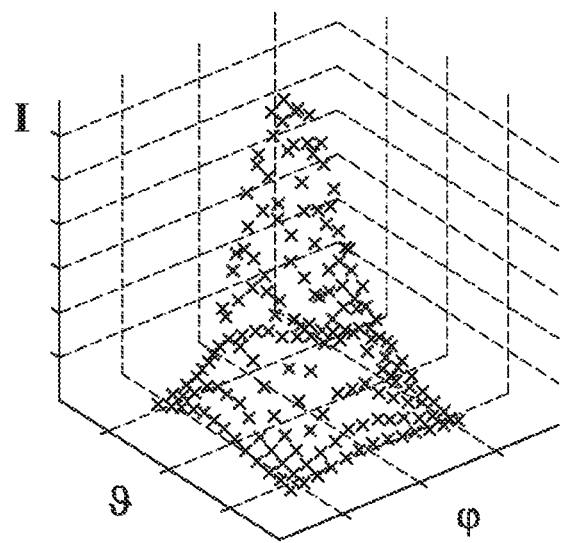
FIG. 13 shows a diagram for illustrating by way of example a distribution of the quantity of light as determined by means of the second exemplary embodiment of the measuring method.

By comparing the average grey-scale values that occur in each of the different images in one and the same ROI, for example at the location xt1, yt1, it is possible to determine the emission characteristic of the filter 52 at the location xt1, yt1 as a function of the emission angles relative to the normal vector 70. FIG. 13 shows the result of such an evaluation. Therein the average grey-scale values determined in each of the different images in the ROI xt1, yt1 are plotted as individual measurement points in a diagram. The diagram in FIG. 13 shows, similarly to the diagram shown in FIG. 9, a distribution of the light intensity as a function of two mutually perpendicular angles relative to the normal vector 70. From this cloud of measurement points it is possible to place a best-fit area by means of known interpolation methods. The area to be sought can be fitted inter alia by means of third- or higher-order 2D polynomials, a pointwise bilinear interpolation, a pointwise bicubic interpolation, a 2D spline area, or a 2D Gaussian function.

From the distribution determined, finally, in method step S228.2, once again the average light emission direction of the filter 52 can be calculated in order to determine the inclination angle β.

It goes without saying that in method step S228.2 and also in method step S228.1, it is also possible to extract further information from the light intensity distribution described, such as, for example, the direction of the maximum transmission of the filter 52 relative to the rotation angle or the variance of the light emission direction over a plurality of measurement points distributed on the top side 60 of the filter 52. If said variance is excessively high, for example, this rather militates against using the filter 52 for the method mentioned above. The spatial-position-dependent maximum transmission ultimately represents the homogeneity of the light passages 58 of the filter 52. Furthermore, the width of the emission cone shown in FIGS. 9 and 13 is a measure of the equidistance of the lamellae forming the light passages 58.

What is claimed is:

1. Coordinate measuring machine, comprising:
an optical sensor for optically capturing image data of a workpiece, wherein the optical sensor comprises a lens, which defines an optical axis;
an illumination device for illuminating the workpiece during the optical capture of the image data;
an evaluation unit configured to evaluate the captured image data and to determine spatial coordinates of the workpiece therefrom,
wherein the illumination device comprises a diffusely radiating luminous body and an optical filter having a plurality of light passages arranged alongside one another and separated from one another, wherein light emitted by the luminous body enters the filter on an underside, passes through the light passages and emerges again from the filter on a top side opposite the underside, wherein each of the light passages transmits only light rays that form an angle smaller than a predefined limiting angle with a longitudinal axis of the respective light passage,
wherein the lens and the filter are inclined relative to one another in such a way that a normal vector aligned perpendicularly to the top side of the filter forms an inclination angle other than 0° with the optical axis, wherein the inclination angle corresponds to an average light emission direction of the filter, wherein the average light emission direction of the filter is an average value of light cone principal axis angles that is determined over at least two of the light passages of the filter, and wherein the light cone principal axis angles are angles that the principal axes of the light cones leaving the light passages form with the normal vector.

2. Coordinate measuring machine according to claim 1, comprising a workpiece support for receiving the workpiece, wherein the workpiece support defines a z-axis running perpendicularly to the workpiece support.

3. Coordinate measuring machine according to claim 2, wherein the optical axis runs parallel to the z-axis, and wherein the normal vector forms the inclination angle with the z-axis.

4. Coordinate measuring machine according to claim 2, wherein the normal vector runs parallel to the z-axis, and wherein the optical axis forms the inclination angle with the z-axis.

5. Coordinate measuring machine according to claim 4, wherein the lens is movable along a movement axis running parallel to the z-axis, and wherein the optical axis forms the inclination angle with the movement axis.

6. Coordinate measuring machine according to claim 4, wherein the lens is movable along a movement axis that forms the inclination angle with the z-axis and runs parallel to the optical axis.

7. Coordinate measuring machine according to claim 1, comprising a filter mount, in which the filter is fixable, wherein the filter mount defines a standing area and an inclination plane inclined relative to the standing area by the inclination angle, which inclination plane, with the filter inserted into the filter mount, is aligned parallel to the top side of the filter.

8. Coordinate measuring machine according to claim 7, wherein the filter mount comprises (i) a component produced by rapid prototyping and constructed in a layered fashion, (ii) a mount with height-adjustable three-point support, or (iii) a cardanic suspension.

9. Method of operating a coordinate measuring machine comprising an optical sensing system including an optical filter having a plurality of light passages arranged alongside one another and separated from one another, which light passages are arranged between an underside of the filter and an opposite top side of the filter, wherein each of the light passages transmits only light rays that form an angle smaller than a predefined limiting angle with a longitudinal axis of the respective light passage, wherein the method comprises the following steps:
providing an optical sensor comprising a lens, which defines an optical axis;
illuminating the filter from its underside by means of a diffusely radiating luminous body;
measuring, by means of the optical sensor, a quantity of light transmitted by the filter, wherein the quantity of light transmitted by the filter is measured at a plurality of measurement points on the top side of the filter and the lens and the filter are moved relative to one another during the measurement process, such that the quantity of light transmitted is measured for each of the measurement points from a plurality of orientations; and
determining a distribution of the measured quantity of transmitted light depending on (i) a location on the top side of the filter and (ii) an emission angle relative to a normal vector aligned perpendicularly to the top side of the filter.

10. Method according to claim 9, comprising the following additional method step:
calculating an average light emission direction of the filter on the basis of the determined distribution, wherein the average light emission direction of the filter is an average value of light cone principal axis angles that is determined over at least two of the light passages of the filter, and wherein the light cone principal axis angles are angles that the principal axes of the light cones leaving the light passages form with the normal vector.

11. Method according to claim 9, wherein, for measuring the quantity of light transmitted by the filter, the lens is moved for the measurement of each of the measurement points into a plurality of positions and a respective image is captured in each of said positions by means of the optical sensor, wherein the positions lie on a spherical cap and are at an equal distance from the respective measurement point on the top side of the filter.

12. Method according to claim 9, wherein, during the measurement process, the filter is pivoted into a plurality of positions about two of its principal axes aligned orthogonally with respect to one another and an image is captured in each of said positions by means of the optical sensor.

13. Method according to claim 12, wherein grey-scale values are determined in each of the captured images in a plurality of defined image regions and the distribution of the measured quantity of light transmitted is determined on the basis of the determined grey-scale values.

14. Method according to claim 12, wherein the filter is pivoted by means of a cardanic suspension.

15. Method according to any of claim 9, wherein a telecentric lens is used as lens.

16. Production method comprising the following steps:
providing a coordinate measuring machine comprising (i) an optical sensor for optically capturing image data of a workpiece, wherein the optical sensor comprises a lens, which defines an optical axis, and comprising (ii) an illumination device for illuminating the workpiece during the optical capture of the image data, wherein the illumination device comprises a diffusely radiating luminous body, and comprising (iii) an evaluation unit configured to evaluate the captured image data and to determine spatial coordinates of the workpiece therefrom;
providing an optical filter having a plurality of light passages arranged alongside one another and separated from one another, which light passages are arranged between an underside of the filter and an opposite top side of the filter, wherein each of the light passages transmits only light rays that form an angle smaller than a predefined limiting angle (a) with a longitudinal axis of the respective light passage;
illuminating the filter from its underside by means of a diffusely radiating luminous body;
measuring, by means of the optical sensor, a quantity of light transmitted by the filter, wherein the quantity of light transmitted by the filter is measured at a plurality of measurement points on the top side of the filter and the lens and the filter are moved relative to one another during the measurement process, such that the quantity of light transmitted is measured for each of the measurement points from a plurality of orientations; and
determining a distribution of the measured quantity of transmitted light depending on (i) a location on the top side of the filter and (ii) an emission angle relative to a normal vector aligned perpendicularly to the top side of the filter
determining an inclination angle on the basis of the determined distribution;
positioning the filter on the luminous body, such that light that is emitted by the luminous body enters on the underside of the filter and at least partly emerges again on the opposite top side of the filter; and
aligning the lens and the filter relative to one another in such a way that a normal vector aligned perpendicularly to the top side of the filter forms the inclination angle other than 0° with the optical axis.

* * * * *